Sept. 24, 1968      A. P. STROM      3,403,362

RATE-OF-RISE TRIPPING DEVICE

Filed Oct. 5, 1966

INVENTOR
Albert P. Strom
BY *Maury I. Hull*
ATTORNEY

United States Patent Office 3,403,362
Patented Sept. 24, 1968

3,403,362
RATE-OF-RISE TRIPPING DEVICE
Albert P. Strom, Pittsburgh, Pa., assignor to Westinghouse Electric Corporation, Pittsburgh, Pa., a corporation of Pennsylvania
Filed Oct. 5, 1966, Ser. No. 584,410
8 Claims. (Cl. 335—174)

ABSTRACT OF THE DISCLOSURE

Rate-of-rise circuit breaker tripping apparatus includes a saturable core having a first or trip winding thereon which supplies a tripping signal to the circuit breaker, and having a second winding thereon across which is connected a non-linear resistor. The flux in the saturable core is a function of the current in the line to be protected and it is also a function of the current flowing in the second winding and the non-linear resistor.

---

This invention relates to improvements in tripping devices, and more particularly to an improved tripping device responsive to the rate of rise of current, for example, a fault current in an electrical circuit.

As will be readily understood by those skilled in the art, when a fault current, for example, the current of a short circuit, occurs in a line which is protected by a "current limiting" circuit breaker, it is desirable to open the circuit as soon as possible after the beginning of the fault current. If the fault current is allowed to reach its maximum value, for example, the maximum value which would occur on a short circuit, considerable damage may be done to equipment, and furthermore the heavy current produces a heavy arc at the breaker contacts which produces wear and ultimately destruction of the contacts.

My rate-of-rise tripping device is useful with current-limiting circuit breakers, and it is also useful with other breakers to shorten the total interrupting time, even if current is not appreciably limited.

To provide for quickly opening a circuit when a fault current occurs therein, it has occurred to others working in this field to use a rate-of-rise tripping device. Generally speaking, a rate-of-rise tripping device consists of a saturable core device which may be an iron core of thin laminations with a short air gap or air gaps therein; one or more turns of the circuit to be interrupted link this core, or the conductor to be protected may pass through a central passageway in the iron core; and a trip winding of one or more turns on the core is connected to the trip means of a high speed latch on the circuit breaker. This latch may in some cases be a permanent magnet device, or a solenoid.

However, if the latch is to be released by current flowing in the trip winding, the current in the trip winding must last for a sufficient period of time to operate the latch. The voltage pulse applied from such a circuit to the unlatching means lasts only until the rate-of-rise iron core saturates, and if this saturation occurs in a short enough period of time, the voltage or current pulse is over before the tripping or unlatching device starts to move. In such an arrangement the voltage or signal pulse of a saturable core device, which is produced when current in the conductor to be protected starts to rise at a high rate, as in a short circuit, is applied to the tripping device, and there is no need to wait for a high current in the line itself to initiate tripping, it being recalled that whereas the flux in the saturable core is proportional to instantaneous current in the protected conductor, the voltage produced in the trip winding is proportional to the rate of change of the flux.

High speed permanent magnet latches have been developed which can be released in 100 to 200 microseconds. By suitable choice of component values for the rate of rise tripping device, including the width of the air gap, for a given current in the conductor to be protected, for example, 5000 amperes, the voltage pulse can be made to last 200 microseconds with a resulting release of the latch and opening of the circuit of the protected conductor.

However, for currents larger than 5000 amperes, for example, short circuit currents running to several times this value, in prior art devices the iron core saturates very quickly, a voltage pulse of very great amplitude and of very short duration is produced; the voltage pulse does not last long enough to trip the latch and result in opening of the contacts of the circuit breaker.

I have overcome the disadvantages of prior art devices by my invention.

In summary, I add a second winding on the same saturable core, the first described winding of which, upon the occurrence of a fault current in the conductor, applies a voltage pulse to the tripping device. This second winding has connected thereacross a non-linear resistor. The value of this reisstor is so chosen that at a fault current of, for example, 5000 amperes, which produces a voltage pulse of sufficient time duration, for example 200 microseconds, to unlatch the breaker and open the contacts, no substantial current flows through the non-linear resistor. For higher values of fault current in the conductor of the line, however, a considerable current is caused to flow through the non-linear resistor, and this current sets up a counter magnetomotive force, reducing the rate-of-rise of flux in the core. This reduces the amplitude of the voltage pulse at the coil connected to the tripping device, and increases the duration of this last named voltage pulse to a sufficient duration to operate the trip device, and hence makes the rate-of-rise trip device useful over a much wider current range.

Accordingly, an object of my invention is to provide a new and improved rate-of-rise circuit breaker tripping circuit.

A further object of my invention is to provide a new and improved rate-of-rise circuit breaker tripping circuit employing means for making the amplitude of the voltage pulse and the duration thereof more nearly uniform over a large range of fault current values in the conductor to be protected.

These and other objects will become more clearly apparent after a study of the following specification, when read in connection with the accompanying drawings, in which.

Figure 1:
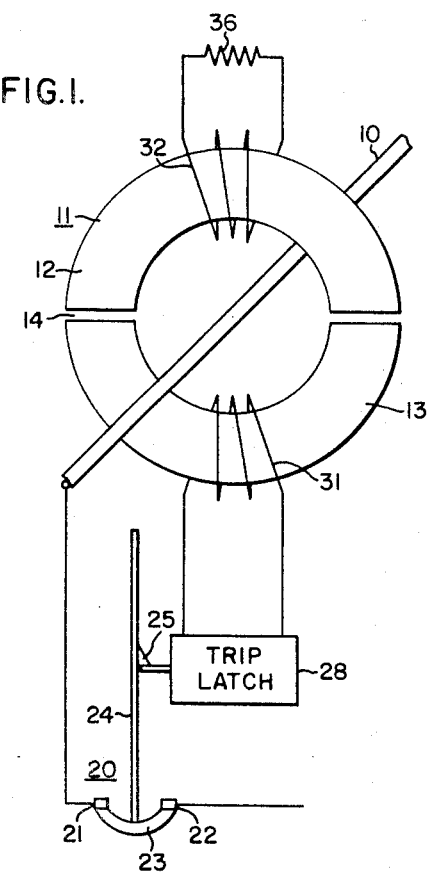
FIGURE 1 is a schematic electrical circuit diagram of my invention according to the preferred embodiment thereof.

In FIG. 1 the conductor to be protected is designated 10, and is shown passing through a large magnetic core generally designated 11, consisting of a plurality of C cores including cores 12 and 13 with air gaps 14 and 15. The line or conductor 10 is connected to one contact 21 of the circuit breaker generally designated 20, the other contact 22 of which is connected in the line, and it is seen that the circuit closing device 23 is permanently secured to an arm 24 which has the latch member 25 secured thereto. Latch member 25 is adapted to be released upon the application of a signal or voltage pulse from coil 31 to latch trip device 28. The latch may be a permanent magnet latch or a solenoid operated latch. It will be readily understood that the arm 24 is spring biased to circuit open position by means not shown for the convenience of illustration.

The aforementioned core, generally designated 11, has two windings 31 and 32 thereon, winding 31 being connected to energize the aforementioned solenoid 28 when a voltage pulse of sufficient amplitude and sufficient duration is generated in the winding 31 as a result of a sudden increase of the current flowing in the conductor 10. The winding 32 has connected thereacross a non-linear resistor 36.

My invention involves use of the fact that the magnitude of the flux in core 11 is directly proportional to the instantaneous current until the core is saturated. With no current flowing in non-linear resistor 36, the flux in core 11 is proportional to the current in conductor 10. While current is flowing in non-linear resistor 36, the flux in core 11 is a function of the conductor or line current minus the current in the coil of the non-linear resistor circuit.

The rate-of-rise of flux is then, prior to saturation proportional to the rate-of-rise of the alternating current. The rate-of-rise of an alternating current as it passes through zero is directly proportional to its R.M.S. value.

The induced voltages in windings 31 and 32 are proportional to the rate of change of flux.

Figure 2:
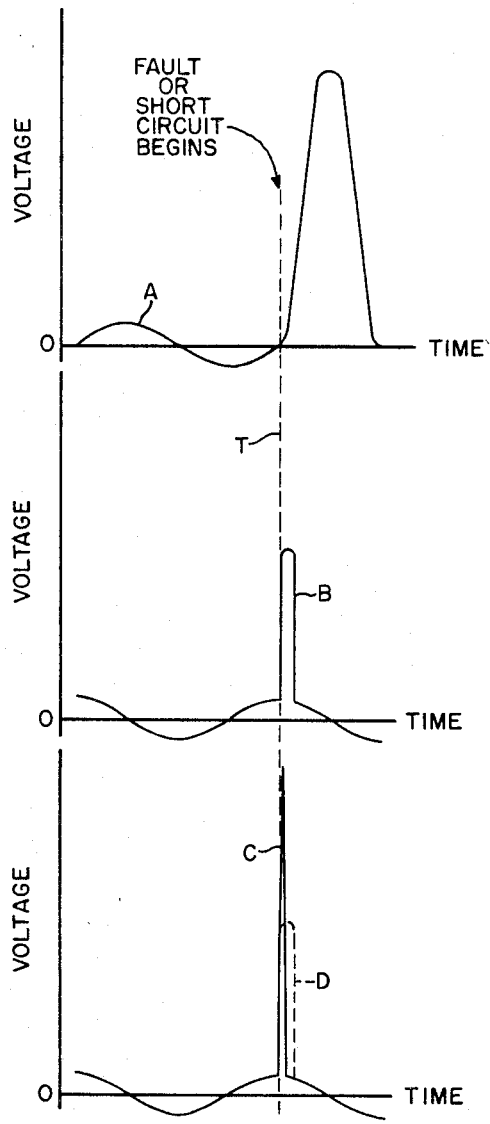
FIG. 2 is a series of graphs illustrating the operation of the apparatus of FIGURE 1.

Particular reference is made now to FIG. 2 for a further understanding of the operation of the apparatus of FIG. 1. The curve A illustrates the current in conductor 10 with a fault or short circuit occurring therein at a time T. It is seen that the normal current indicated by the curve A reaches a very large value and thereafter falls to zero, this occurring within a relatively large time.

Curve B illustrates the voltage pulse produced across the winding 31. This voltage pulse, illustrated by curve B, shows that for a given value of fault current, or rate of change or rate of rise of current in conductor 10, the voltage pulse in winding 31 may have a large amplitude and a duration of at least 200 microseconds, sufficient to operate the latch trip 28 and open the circuit of conductor 10.

In the lower graph, the curve C illustrates the voltage pulse which would be produced without the addition of a non-linear resistor by a short circuit current several times the value of the current in conductor 10 which produced the voltage pulse of curve B. It is seen that for a complete short circuit with a very heavy current in the conductor 10, a very sharp voltage pulse C of great amplitude but of very short duration is produced in the coil 31, the voltage pulse C not lasting for the necessary length of time to operate the unlatch device 28.

Under the same or similar current conditions in line 10, with the non-linear resistor 36 connected across the supplemental winding 32, the voltage pulse produced in winding 31 would be that shown in curve D, and it is seen that the pulse D has sufficient amplitude and has sufficient duration to operate unlatch device 28 and unlatch the latch 25 and open the circuit of conductor 10.

Accordingly, it is seen that I have accomplished the objectives of my invention by adding a supplemental winding to the saturable core 11 and connecting across that winding a suitable non-linear resistor, and have thereby provided for the production of a voltage pulse of the proper amplitude and duration to operate unlatch device 28 and release the latch and open the circuit over a wider range of fault current conditions in conductor 10 than could have been achieved by any circuits of the prior art.

Non-linear resistor 36 may be made adjustable in value.

Figure 3:
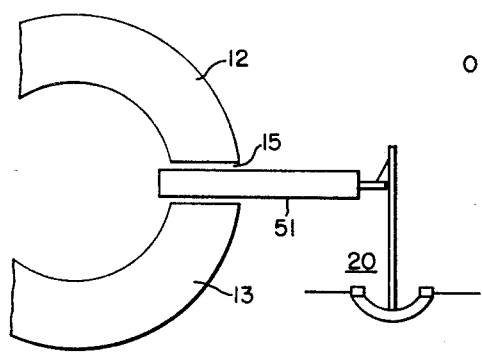
FIG. 3 shows a fragmentary view of a modification of my invention.

Particular reference is made now to FIG. 3. Turn 51 operating the latch has one side in the air gap so that the conductor in the field acts as a motor to pull the latch open.

Whereas I have shown and described my device with respect to embodiments thereof which give satisfactory results, it should be understood that the drawings and the written description are illustrative only and should not be interpreted in a limiting sense.

I claim as my invention:

1. A rate-of-rise circuit breaker trip control circuit including in combination, a saturable core coupled to the conductor to be protected and having a magnetic flux produced therein proportional to the instantaneous current in the conductor, circuit breaker means including a signal-releasable latch connected in circuit with the conductor, a first winding on the saturable core having the output signal thereof applied to the latch to release the latch upon the occurrence in the first winding of a signal pulse of at least a predetermined amplitude and of at least a predetermined duration produced by a fault current of one value in the conductor, a second winding on the saturable core, and a non-linear resistor connected across said second winding, the non-linear resistor having a substantial current flowing therethrough for fault currents in the conductor substantially exceeding said one value thereby reducing the amplitude of the signal pulse produced in the first winding and increasing the time duration of the signal pulse produced in the first winding to a value sufficient to operate the latch and open the contacts of the circuit breaker in the line to be protected.

2. Rate-of-rise current responsive apparatus suitable for use in unlatching a circuit breaker connected in a line to be protected, said circuit breaker including unlatching means operable by a signal of at least a predetermined amplitude and at least a predetermined duration, comprising, in combination, saturable core means coupled to the line to be protected and having a flux produced therein which is a function of the instantaneous current in the line, a winding on the saturable core means connected to the unlatching means of the circuit breaker, and means including an additional winding on the saturable core means and a non-linear resistor connected thereacross, the flux in the saturable core means also being a function of the current flowing in the non-linear resistor whereby the amplitude of signal pulses in the first named winding are reduced and the duration of signal pulses in the first named winding produced by fault currents in the line exceeding a predetermined value are increased.

3. Apparatus according to claim 2 in which the unlatching means of the circuit breaker is additionally characterized as including a permanent magnet device.

4. Apparatus according to claim 2 in which the saturable core means is additionally characterized as including an arrangement of two C cores mounted adjacent each other with air spaces therebetween to form a substantially circular core structure, and the conductor to be protected passes through the central opening of the circular core structure.

5. Circuit apparatus for use in unlatching a circuit breaker connected in a line to be protected, said circuit breaker including unlatching means operated in response to movement of a member out of engagement with a latch member, comprising, in combination, saturable core means coupled to the line to be protected, the core means having an air gap therein, a winding on the saturable core means, a non-linear resistor connected across said winding, the saturable core means having a flux produced therein which is a function of the instantaneous current in the line, and at least one turn of a conductor located in the air gap and having a force exerted thereon by flux of the saturable core, the turn having said member secured thereto, the conductor in the flux field of the saturable core acting as a motor and moving the member to unlatch the circuit breaker when a fault current of at least a predetermined value occurs in the line to be protected.

6. A rate-of-rise circuit breaker trip control circuit including in combination, a saturable core coupled to the conductor to be protected and having a magnetic flux produced therein proportional to the instantaneous current in the conductor until the flux attains a value which saturates the core, circuit breaker means connected in series with the conductor and including a signal-releasable latch, a first winding on the saturable core having the output signal thereof applied to the latch to release the latch and open the circuit breaker upon the occurrence in the first winding of an output signal of at least a predetermined amplitude and of at least a predetermined duration produced by a fault current of a first value in the conductor, said output signal having an amplitude proportional to the rate of change of flux in the core, said output signal having a duration not substantially longer than the time interval between the beginning of the fault current and the saturation of the core, a second winding on the saturable core, and a non-linear resistor connected across the second winding, current flowing in the second winding when the rate of change of flux in said core exceeds a predetermined value as a result of a fault current of a value greater than the first named value in the conductor to be protected, said current flowing in the second winding setting up a counter magnetomotive force and reducing the rate-of-rise of flux in said core resulting from said last named fault current thereby increasing the time to saturation of the core and increasing the duration of the signal applied to the latch whereby a signal of sufficient duration is applied to the latch to operate the same notwithstanding the increased rate of change of current in the conductor to be protected.

7. Apparatus according to claim 6 in which the signal releasable latch of the circuit breaker is additionally characterized as including a permanent magnet device.

8. A rate-of-rise circuit breaker trip control circuit including in combination, a saturable core assembly including pair of C-cores mounted adjacent each other to form a substantially circular saturable core with air gaps between adjacent legs of the C-cores respectively, a conductor to be protected passing through the central aperture of the circular core and coupled thereto whereby a magnetic flux is produced in the core proportional to the instantaneous current in the conductor until the flux attains a value which saturates the core, circuit breaker means connected in series with the conductor and including a signal-releasable latch, a first winding on the saturable core having the output signal thereof applied to the latch to release the latch and open the circuit breaker upon the occurrence in the first winding of an output signal of at least a predetermined amplitude and of at least a predetermined duration produced by a fault current of a first value in the conductor, said output signal having an amplitude proportional to the rate of change of flux in the core, said output signal having a duration not substantially longer than the time interval between the beginning of the fault current and the saturation of the core, a second winding on the saturable core, and a non-linear resistor connected across the second winding, current flowing in the second winding when the rate of change of flux in said core exceeds a predetermined value as a result of a fault current of a value greater than the first named value in the conductor to be protected, said current flowing in the second winding setting up a counter magnetomotive force and reducing the rate of rise of flux in said core resulting from said last named fault current thereby increasing the time to saturation of the core and increasing the duration of the signal applied to the latch whereby a signal of sufficient duration is applied to the latch to operate the same notwithstanding the increased rate of change of current in the conductor to be protected.

References Cited
UNITED STATES PATENTS

| | | | |
|---|---|---|---|
| 2,474,029 | 6/1949 | Bohn | 335—174 |
| 2,495,633 | 1/1950 | Hayward | 335—174 |
| 2,881,287 | 4/1959 | Clausing | 335—174 |

BERNARD A. GILHEANY, *Primary Examiner.*

H. BROOME, *Assistant Examiner.*